US009489449B1

(12) United States Patent
Scholl et al.

(10) Patent No.: US 9,489,449 B1
(45) Date of Patent: Nov. 8, 2016

(54) METHOD AND SYSTEM FOR IDENTIFYING KEYWORDS FOR USE IN PLACING KEYWORD-TARGETED ADVERTISEMENTS

(75) Inventors: Nathaniel B. Scholl, Issaquah, WA (US); Alexander W. DeNeui, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 79 days.

(21) Appl. No.: 12/783,819

(22) Filed: May 20, 2010

Related U.S. Application Data

(62) Division of application No. 10/914,722, filed on Aug. 9, 2004, now Pat. No. 7,752,200.

(51) Int. Cl.
*G06F 17/30* (2006.01)

(52) U.S. Cl.
CPC ................. *G06F 17/30646* (2013.01)

(58) Field of Classification Search
CPC ............ G06F 17/30634; G06F 17/30867; G06F 17/30616; G06F 17/3071; G06F 17/2863
USPC ........ 707/769, 736, 750, 730, 706, 741, 713
See application file for complete search history.

(56) References Cited

U.S. PATENT DOCUMENTS

| | | | |
|---|---|---|---|
| 5,615,109 A | 3/1997 | Eder | |
| 5,845,527 A | 12/1998 | Hoffmann | |
| 5,937,392 A | 8/1999 | Alberts | |
| 6,078,866 A | 6/2000 | Buck et al. | |
| 6,112,021 A * | 8/2000 | Brand | ............................... 703/2 |
| 6,128,651 A | 10/2000 | Cezar | |
| 6,169,999 B1 * | 1/2001 | Kanno | ........................... 715/255 |

(Continued)

FOREIGN PATENT DOCUMENTS

| | | |
|---|---|---|
| CN | 1269897 | 10/2000 |
| CN | 1306258 | 8/2001 |

(Continued)

OTHER PUBLICATIONS

Charlwood, W., "AdWords bid price; Facts about AdSense.com—Publishers and Advertisers; Vickrey auctions and AdWords; Vickrey Second Price Auctions," located at <http://www.facstaboutadsense.com/vickrey.htm>, last accessed on Feb. 24, 2009, 6 pages.

(Continued)

*Primary Examiner* — James Trujillo
*Assistant Examiner* — Fariborz Khoshnoodi
(74) *Attorney, Agent, or Firm* — Hogan Lovells US LLP

(57) ABSTRACT

A method and system for identifying search terms for placing advertisements along with search results is provided. The advertisement system selects a description of an item that is to be advertised. The advertisement system then retrieves documents that match the selected description. The advertisement system generates a score for each word of the retrieved documents that indicates relatedness of the word to the item to be advertised. After generating the scores for the words, the advertisement system identifies phrases of the words within the documents that are related to the item. The advertisement system then generates search terms for the item to be advertised from the identified phrases. The advertisement system submits the search terms and an advertisement to a search engines service for placement of a paid-for advertisement for the item.

21 Claims, 6 Drawing Sheets

(56) References Cited

U.S. PATENT DOCUMENTS

| | | |
|---|---|---|
| 6,269,361 B1 | 7/2001 | Davis et al. |
| 6,424,963 B1* | 7/2002 | Ito et al. |
| 6,449,657 B2 | 9/2002 | Stanbach et al. |
| 6,591,248 B1 | 7/2003 | Nakamura et al. |
| 6,606,644 B1 | 8/2003 | Ford et al. |
| 6,751,621 B1 | 6/2004 | Calistri-Yeh et al. |
| 6,763,362 B2 | 7/2004 | McKeeth |
| 6,826,572 B2 | 11/2004 | Colace et al. |
| 6,915,294 B1 | 7/2005 | Singh et al. |
| 6,920,464 B2 | 7/2005 | Fox |
| 6,963,863 B1 | 11/2005 | Bannon |
| 6,978,263 B2 | 12/2005 | Soulanille |
| 7,031,932 B1 | 4/2006 | Lipsky et al. |
| 7,035,812 B2 | 4/2006 | Meisel et al. |
| 7,043,450 B2 | 5/2006 | Vélez et al. |
| 7,076,443 B1 | 7/2006 | Emens et al. |
| 7,076,479 B1 | 7/2006 | Cheung et al. |
| 7,080,073 B1 | 7/2006 | Jiang et al. |
| 7,225,182 B2 | 5/2007 | Paine et al. |
| 7,346,839 B2 | 3/2008 | Acharya et al. |
| 7,363,254 B2 | 4/2008 | Skinner |
| 7,376,588 B1 | 5/2008 | Gregov et al. |
| 8,655,727 B2 | 2/2014 | Scholl et al. |
| 8,788,320 B1 | 7/2014 | Snyder et al. |
| 2001/0053999 A1 | 12/2001 | Feinberg |
| 2002/0024532 A1 | 2/2002 | Fables et al. |
| 2002/0094868 A1 | 7/2002 | Tuck et al. |
| 2002/0103698 A1 | 8/2002 | Cantrell |
| 2002/0116291 A1* | 8/2002 | Grasso et al. ............... 705/27 |
| 2003/0018501 A1 | 1/2003 | Shan |
| 2003/0055816 A1 | 3/2003 | Paine et al. |
| 2003/0078913 A1 | 4/2003 | McGreevy |
| 2003/0105677 A1 | 6/2003 | Skinner |
| 2003/0120626 A1 | 6/2003 | Piotrowski |
| 2003/0120641 A1 | 6/2003 | Pelletier |
| 2003/0216930 A1 | 11/2003 | Dunham et al. |
| 2004/0030556 A1 | 2/2004 | Bennett |
| 2004/0044571 A1 | 3/2004 | Bronnimann et al. |
| 2004/0054677 A1* | 3/2004 | Mueller et al. ............. 707/100 |
| 2004/0088241 A1 | 5/2004 | Rebane et al. |
| 2004/0103070 A1 | 5/2004 | Joseph |
| 2004/0133469 A1 | 7/2004 | Chang |
| 2004/0162757 A1 | 8/2004 | Pisaris-Henderson et al. |
| 2004/0181520 A1* | 9/2004 | Imaichi et al. ................. 707/3 |
| 2004/0186831 A1* | 9/2004 | Hiratsuka et al. ............. 707/3 |
| 2004/0243581 A1 | 12/2004 | Weissman et al. |
| 2004/0267806 A1 | 12/2004 | Lester |
| 2005/0065806 A1 | 3/2005 | Harik |
| 2005/0065909 A1* | 3/2005 | Musgrove et al. ............. 707/2 |
| 2005/0071325 A1 | 3/2005 | Bem |
| 2005/0097024 A1 | 5/2005 | Rainey |
| 2005/0114198 A1 | 5/2005 | Koningstein et al. |
| 2005/0120311 A1 | 6/2005 | Thrall |
| 2005/0137939 A1 | 6/2005 | Calabria et al. |
| 2005/0144064 A1 | 6/2005 | Calabria et al. |
| 2005/0144068 A1 | 6/2005 | Calabria et al. |
| 2005/0144069 A1 | 6/2005 | Wiseman et al. |
| 2005/0149388 A1 | 7/2005 | Scholl |
| 2005/0149390 A1 | 7/2005 | Scholl et al. |
| 2005/0160002 A1 | 7/2005 | Roetter et al. |
| 2005/0197829 A1* | 9/2005 | Okumura ...................... 704/10 |
| 2005/0216335 A1 | 9/2005 | Fikes et al. |
| 2005/0216516 A1 | 9/2005 | Calistri-Yeh et al. |
| 2005/0228797 A1 | 10/2005 | Koningstein et al. |
| 2005/0267872 A1 | 12/2005 | Galai et al. |
| 2006/0041480 A1 | 2/2006 | Briggs |
| 2006/0161635 A1 | 7/2006 | Lamkin et al. |
| 2007/0266020 A1* | 11/2007 | Case et al. ..................... 707/5 |
| 2010/0005094 A1* | 1/2010 | Poltorak ......................... 707/5 |

FOREIGN PATENT DOCUMENTS

| | | |
|---|---|---|
| CN | 201210031669.8 | 12/2015 |
| JP | 2002-278949 A | 9/2002 |
| WO | WO 97/22066 A1 | 6/1997 |

OTHER PUBLICATIONS

Lee, K., "Overture's Auto Bid Shifts the Gap," DMNews, Did-it. com, Aug. 22, 2002, located at <http://www.dmnews.com/Overtures-Auto-Bid-Shifts-the-Gap/article/78443>, last accessed on Feb. 25, 2009, 5 pages.

Seda, C., "Perfecting Paid Search Engine Listings-Search," Engine Watch (SEW) SearchEngineWatch.com, Oct. 17, 2002, located at <http://www.searchenginewatch.com/2161001>, last accessed on Feb. 25, 2009, 7 pages.

Sherman, C., "A Closer Look at Overture's Auto Bid System," Oct. 28, 2002, located at <http://www.searchenginewatch.com/2161071/print>, last accessed on Feb. 25, 2009, 3 pages.

Submit Express, "Google reindexes/partners with Ask Jeeves, Overture's Auto Bidding Tool, Teoma Toolbar, FTC," Submit Express Newsletter #56, Jul. 19, 2002, located at <http://www.submitexpress.com/newletters/july_19_02.html>, last accessed on Feb. 25, 2009, 9 pages.

"Canadian Office Action dated Dec. 22, 2011", CA Application 2,575,734, Dec. 22, 2011, 3 pages.

"Decision on Rejection dated Oct. 23, 2009", Chinese Application No. 200580026931.8, Oct. 23, 2009, 11 pages.

"European Search Report dated Dec. 28, 2010", European Application No. 05784894.7, Dec. 28, 2010, 7 pages.

"Final Office Action dated Nov. 24, 2008", Korean Application No. 10-2007-7005484, Nov. 24, 2008, 3 pages.

"Final Office Action dated Apr. 20, 2010", Japanese Application No. 2007-525710, Apr. 20, 2010, 10 pages.

"Final Office Action dated Sep. 3, 2010", Japanese Application No. 2007-525710, Sep. 3, 2010, 4 pages.

"International Search Report mailed Nov. 22, 2006", PCT Application No. PCT/US2004/044021, Nov. 22, 2006, 2 pages.

"Japanese Official Notice of Rejection mailed Dec. 18, 2009", Japanese Patent Application 2007-525710, Dec. 8, 2009, 16 pages. (including English translation).

"Notice on Acceptance for Request for Reexamination dated Sep. 26, 2010", Chinese Application No. 200580026931.8, Sep. 26, 2010, 3 pages.

"Notice on Reexamination dated Apr. 15, 2011", Chinese Application No. 200580026931.8, Apr. 15, 2011, 16 pages.

"Office Action dated Aug. 7, 2012", Indian Application No. 1087/DELNP/2007, Aug. 7, 2012, 1 page.

"PCT International Search Report dated Jun. 23, 2006", PCT Application No. PCT/US2005/028148, Jun. 23, 2006, 1 page.

"Second Office Action dated Jun. 12, 2009", Chinese Application No. 200580026931.8, Jun. 12, 2009, 3 pages.

Non Final Office Action dated Sep. 29, 2014; for U.S. Appl. No. 10/748,694 (10 pages).

Final Office Action dated Jan. 31, 2014; for U.S. Appl. No. 10/748,694 (9 pages).

Non Final Office Action dated Aug. 29, 2013; for U.S. Appl. No. 10/748,694 (10 pages).

Non Final Office Action dated May 15, 2014; for U.S. Appl. No. 11/274,486 (11 pages).

Non Final Office Action dated Dec. 1, 2014; for U.S. Appl. No. 11/274,486 (6 pages).

Final Office Action dated Aug. 13, 2013; for U.S. Appl. No. 10/917,227 (13 pages).

Non Final Office Action dated Jan. 1, 2014; for U.S. Appl. No. 10/917,227 (16 pages).

Non Final Office Action dated Oct. 25, 2013; for U.S. Appl. No. 11/692,634 (7 pages).

Notice of Allowance dated Jun. 27, 2014; for U.S. Appl. No. 11/692,634 (8 pages).

First Office Action dated Feb. 14, 2014; for China Application No. 20120031669.8 ( 20 pages).

Second Office Action dated Oct. 15, 2014; for China Application No. 20120031669.8 ( 15 pages).

US Final Office Action issued in U.S. Appl. No. 10/748,694 dated Mar. 6, 2015.

US Final Office Action issued in U.S. Appl. No. 11/274,486 dated Mar. 20, 2015.

CA Examiner's Report issued in application serial No. 2,550,853 dated Mar. 20, 2015.

* cited by examiner

METHOD AND SYSTEM FOR IDENTIFYING KEYWORDS FOR USE IN PLACING KEYWORD-TARGETED ADVERTISEMENTS

CROSS-REFERENCES TO RELATED APPLICATIONS

This application is a divisional of U.S. patent application Ser. No. 10/914,722, filed on Aug. 9, 2004, of which the full disclosure of this application is incorporated herein by reference for all purposes.

BACKGROUND

The described technology relates generally to terms that are related to an item and specifically to search terms for use in placing advertisements for the item. Many search engine services, such as Google and Overture, provide for searching for information that is accessible via the Internet. These search engine services allow users to search for web pages and other Internet-accessible resources that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. Some search engine services can even search information sources that are not accessible via the Internet. For example, a book publisher may make the content of its books available to a search engine service. The search engine may generate a mapping between the keywords and books. When a search engine service receives a search request that includes one or more search terms, it uses its mapping to identify those information sources (e.g., web pages or books) whose keywords most closely match the search terms. The collection of information sources that most closely matches the search terms is referred to as the "search result." The search engine service then ranks the information sources of the search result based on the closeness of each match, web page popularity (e.g., Google's page ranking), and so on. The search engine service then displays to the user links to those information sources in an order that is based on their rankings.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results." An advertiser who wants to place an advertisement for an item along with certain search results provides a search engine service with an advertisement and search terms. When a search request is received, the search engine service identifies the advertisements whose search terms most closely match those of the search request. The search engine services can either charge for placement of each advertisement along with search results (i.e., cost per impression) or charge only when a user actually selects a link associated with an advertisement (i.e., cost per click).

Advertisers would like to maximize the effectiveness of advertising dollars used to pay for advertisements placed along with search results. Those advertisers try to identify search terms for items being advertised that result in the highest benefit (e.g., most profit) to the advertiser. It would be desirable to have techniques that would allow advertisers to maximize the effectiveness of their advertising dollars by identifying search terms that are more targeted to or related to the item being advertised.

DETAILED DESCRIPTION

Figure 1:
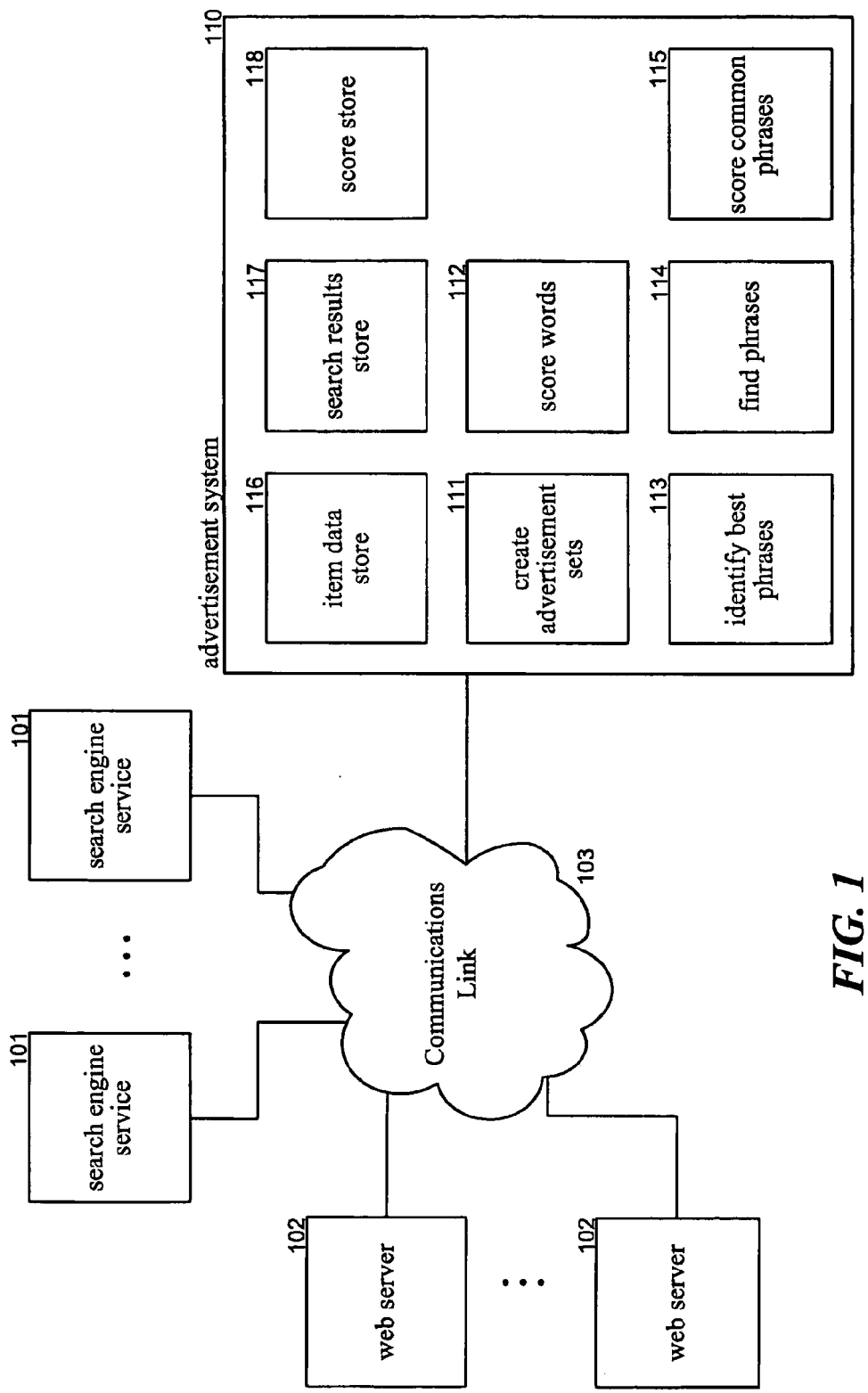
FIG. 1 is a block diagram that illustrates components of the advertisement system in one embodiment.

A method and system for identifying search terms for placing advertisements along with search results is provided. In one embodiment, the advertisement system selects a description of an item that is to be advertised. For example, if the item is a book, then the description may be the title of the book; or if the item is an electronic device, then the description may be a brief summary of the device. The advertisement system then retrieves documents or other information sources that match (e.g., are most closely related to the subject of) the selected description from a corpus of information sources. For example, the advertisement system may submit the selected description to a search engine service with the web pages of the search results being the retrieved documents. The advertisement system then generates a score for each word of the retrieved documents that indicates relatedness of the word to the item to be advertised. In one embodiment, the advertisement system may generate a high score for words that are used much more frequently within the retrieved documents than within the corpus of the information sources. For example, if the item is a Harry Potter book, then words such as "Hogwarts," "Fluffy," "three-headed," "dog," "Hermione," and "Granger" may have a relatively high score because those words appear more frequently in discussions of Harry Potter than in unrelated discussions. After generating the scores for the words, the advertisement system identifies phrases of the words within the documents that are likely to be related to the item. For example, the advertisement system may identify that the phrases "Fluffy the three-headed dog" and "Hermione Granger" are likely related to the book. The advertisement system then generates search terms for the item to be advertised from the identified phrases. The advertisement system submits the search terms and an advertisement to a search engines service for placement of a paid-for advertisement for the item. For example, the advertisement system may place an advertisement for the Harry Potter book with the search term "Hermione Granger." When someone submits a search request of "Hermione Granger" to the search engine service, it will display that advertisement along with the search results. In this way, the advertisement system can identify search terms based on phrases used in information sources that are known to be related to the item that is to be advertised.

In one embodiment, the advertisement system identifies phrases that are likely to be related to the item to be advertised. Because the number of phrases within a document is $O(n^2)$, when n is the number of words within a document and the number of possible phrases in a corpus of documents is $k^l$ where k is the number of distinct words and l is the length of the phrase, it would be computationally very expensive to evaluate and track every possible phrase. To reduce the number of phrases that are evaluated, the advertisement system evaluates groups of words with high scores that are in close proximity to each other. The advertisement system initially generates a score for the words within documents that are related to the item. The score indicates the likelihood that the word is related to the item. The advertisement system may then identify highly related words and related words. A highly related word has a very high score such as a score in the top 10%, and a related word has a high score such as a score in the top 25%. The advertisement system searches the documents for the highly related words. Each highly related word within a document is considered the "anchor word" of a phrase. The advertisement system tries to extend the phrase to include nearby related words. In one embodiment, the advertisement system may extend the phrase by any contiguous related words that follow the anchor word. For example, if "Hermione" is a highly related word and "Granger" is a related word, the phrase "Hermione Granger" would be identified as a phrase when "Hermione" is followed by "Granger" in a document. Alternatively, the advertisement system may extend the phrase to also include words before the anchor word. For example, if "Granger" is a highly related word and "Hermione" is only a related word, then the phrase "Hermione Granger" would still be identified. The advertisement system may calculate a phrase score and continue extending a phrase so long as the score of the extended phrase increases regardless of whether all the words of the phrase are related words. One skilled in the art will appreciate that the technique for identifying such phrases may be used in contexts other than generating search terms for advertisements. For example, a search engine service may use the phrases identified in the search results as search requests for locating additional related information sources to present to a user. Alternatively, the advertisement system could identify more phrases from the additional related information sources. More generally, given a corpus of information sources, the technique for identifying phrases can be used to identify topics of the information sources. For example, if the information sources are chat discussions, then the identified phrases may represent the most popular topics of the chat discussions.

FIG. 1 is a block diagram that illustrates components of the advertisement system in one embodiment. The advertisement system 110 is connected to search engine service computer systems 101 and web server computer systems 102 via a communications link 103. The advertisement system submits a description of an item to a search engine service computer system and receives links to matching web pages that are provided by the web server computer systems. The advertisement system then retrieves the matching web pages from the web server computer systems. The advertisement system identifies phrases from those matching web pages and derives search terms from the identified phrases. The advertisement system then submits to the search engine services the search terms along with an advertisement for the item. The search engine services display the advertisement along with search results for a search query that matches the search terms.

The advertisement system includes a create advertisement sets component 111, a score words component 112, an identify best phrases component 113, a find phrases component 114, a score common phrases component 115, an item data store 116, a search results store 117, and a score store 118. The item data store contains an identifier (e.g., SKU) of each item to be advertised along with a description of the item. For example, the item data store may be an electronic catalog of books that are to be advertised. Each catalog entry may include an item identifier, a title, an author name, a summary, and so on. The search results store contains the matching web pages for the item for which search terms are being identified. The score store contains the score for the words and phrases of the search results store. The create advertisement sets component is provided with an item identifier and identifies search terms (e.g., keywords) to be used when advertising that item. The create advertisement sets component requests a search engine service to provide search results, retrieves the web pages of those search results, invokes the score words component and the identify best phrases component, and then generates the advertisement sets. The score words component generates a score for each word of the search results that indicates a likelihood that the word is related to the item. The identify best phrases component invokes the find phrases component and the score common phrases component to identify phrases that are likely to be related to the item.

The advertisement system may be implemented on computer systems and servers that include a central processing unit, a memory, input devices (e.g., keyboard and pointing devices), output devices (e.g., display devices), and storage devices (e.g., disk drives). The memory and storage devices are computer-readable media that may contain instructions that implement the advertisement system. In addition, the data structures and message structures may be stored or transmitted via a data transmission medium, such as a signal on a communications link. Various communications links may be used, such as the Internet, a local area network, a wide area network, or a point-to-point dial-up connection.

Figure 2:
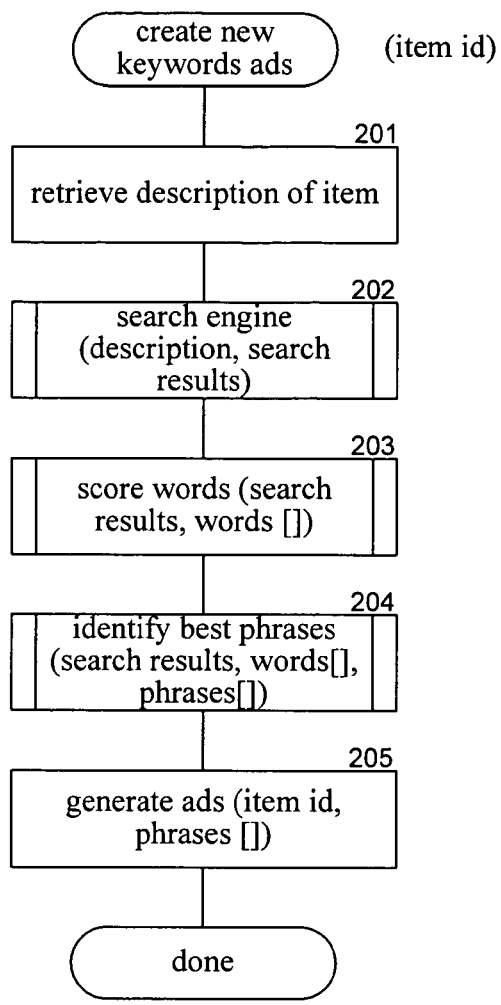
FIG. 2 is a flow diagram that illustrates the processing of the create advertisement sets component in one embodiment.

FIG. 2 is a flow diagram that illustrates the processing of the create advertisement sets component in one embodiment. The component is passed an identifier of an item and returns the advertisement sets with search terms derived from phrases that are likely to be related to the item. In block 201, the item retrieves a description of the item. For example, the description may be the title of the book or the item name combined with the manufacturer name (e.g., "Sony DVD player"). In block 202, the component requests a search engine service to perform a search using the retrieved description as the search request. The component receives the search results. If the search results are links, such as URLs to web pages, then the component retrieves the linked web pages and stores them in the search results store. The component may store and use only the best matching web pages (e.g., the top 15) of the search results. In block 203, the component invokes the score words component to generate a score for each word in the search results. The invoked component stores the scores in the score store. In block 204, the component invokes the identify best phrases component to identify the phrases that are most highly related to the item. The invoked component stores the phrase scores in the score store. In block 205, the component generates advertisement sets for the item using the best phrases. The component then completes. These advertisement sets may then be submitted to one or more search engine services.

Figure 3:
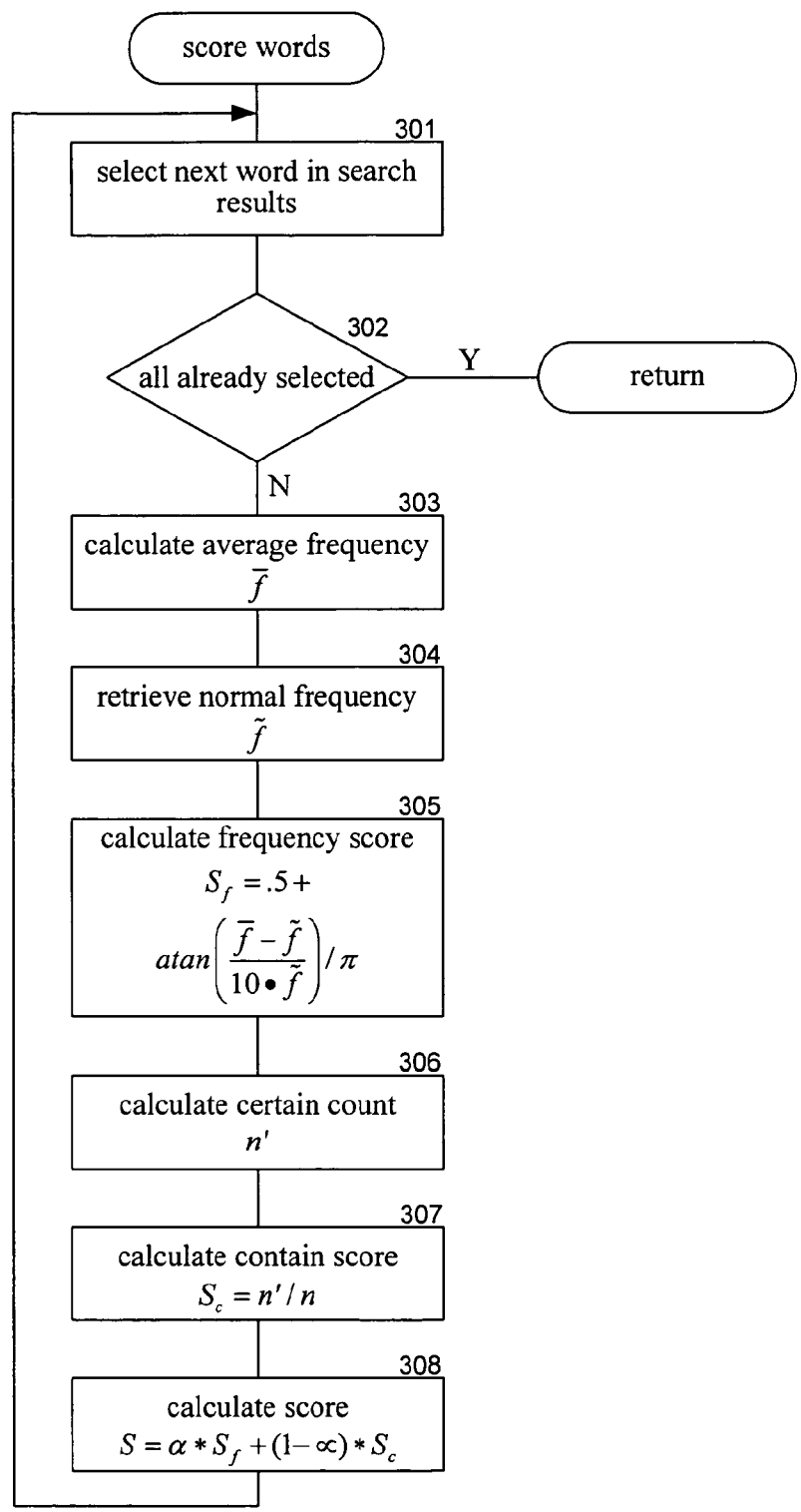
FIG. 3 is a flow diagram that illustrates the processing of the score words component in one embodiment.

FIG. 3 is a flow diagram that illustrates the processing of the score words component in one embodiment. The score words component generates a score for each word stored in the web pages of the search results store. The component stores the scores in the score store. In blocks 301-308, the component loops selecting each word in the search results and calculating its score. In block 301, the component selects the next word in the search results. In decision block 302, if all the words in the search results have already been selected, then the component returns, else the component continues at block 303. One skilled in the art will appreciate that the component may skip noise words (e.g., "of," "a," "the," and so on). In block 303, the component calculates the average frequency of the selected word within the documents (e.g., web pages) of the search results. The "frequency" of a word is the number of occurrences of that word within the document divided by the total number of occurrences of words within that document. For example, if a word occurs 10 times within a document that contains 200 words, then its frequency is 0.05 (i.e., 10/200), which means that it accounts for 5% of the words in the document. The "average frequency" of a word within the search results is the average of the frequencies of that word for each document. For example, if the frequencies for a word are 0.05, 0.04, 0.02, and 0.01 in a search result that has four documents, then the average frequency for that word is 0.03 (e.g., (0.05+0.04+0.02+0.01)/4). The average frequency is represented by the following equation:

$$\bar{f} = \frac{\sum_{i=1}^{n} f_i}{n} \quad (1)$$

where $\bar{f}$ is the average frequency of a word, $f_i$ is the frequency of the word in document i, and n is the number of documents. In block 304, the component retrieves the "normal frequency" for the word. The normal frequency represents the average frequency of the word in a very large corpus of documents, such as all web pages. In block 305, the component calculates a "frequency score" for the selected word. If the average frequency of the selected word is much higher than the normal frequency of the selected word, then the word may be highly related to the item. The frequency score provides a scoring of the average frequency relative to the normal frequency. The frequency score may be represented by the following equation:

$$S_f = .5 + \frac{\operatorname{atan}\left(\frac{\bar{f} - \tilde{f}}{10 * \tilde{f}}\right)}{\pi} \quad (2)$$

where $S_f$ is the frequency score for the word, $\tilde{f}$ is the normal frequency of the word, and a tan is the arc tangent function. One skilled in the art will appreciate that this equation is just one of many equations that can be used to generate the frequency score. The particular equation used can be selected based on the weight to be given to the difference between the average and normal frequencies of a word. In block 306, the component calculates the number of documents of the search results that contain the selected word. In block 307, the component calculates a "contain score" that indicates the fraction of the documents of the search results that contain the selected word. The contain score may be represented by the following equation:

$$S_c = n'/n \quad (3)$$

where $S_c$ is the contain score and n' is the number of documents of the search results that contain the selected word. In block 308, the component calculates the score for the selected word. In one embodiment, the word score is a linear combination of the frequency score and the contain score. The weight of the frequency score and the contain score can be set to reflect whether the frequency score or the contain score is considered to be a more accurate representation of the likelihood that the word is related to the item. The word score may be represented by the following equation:

$$S = \alpha * S_f + (1-\alpha) * S_c \quad (4)$$

where S is the word score and $\alpha$ varies from zero to one and represents the weight given to the frequency score. The component then loops to block 301 to select the next word in the search results.

Figure 4:
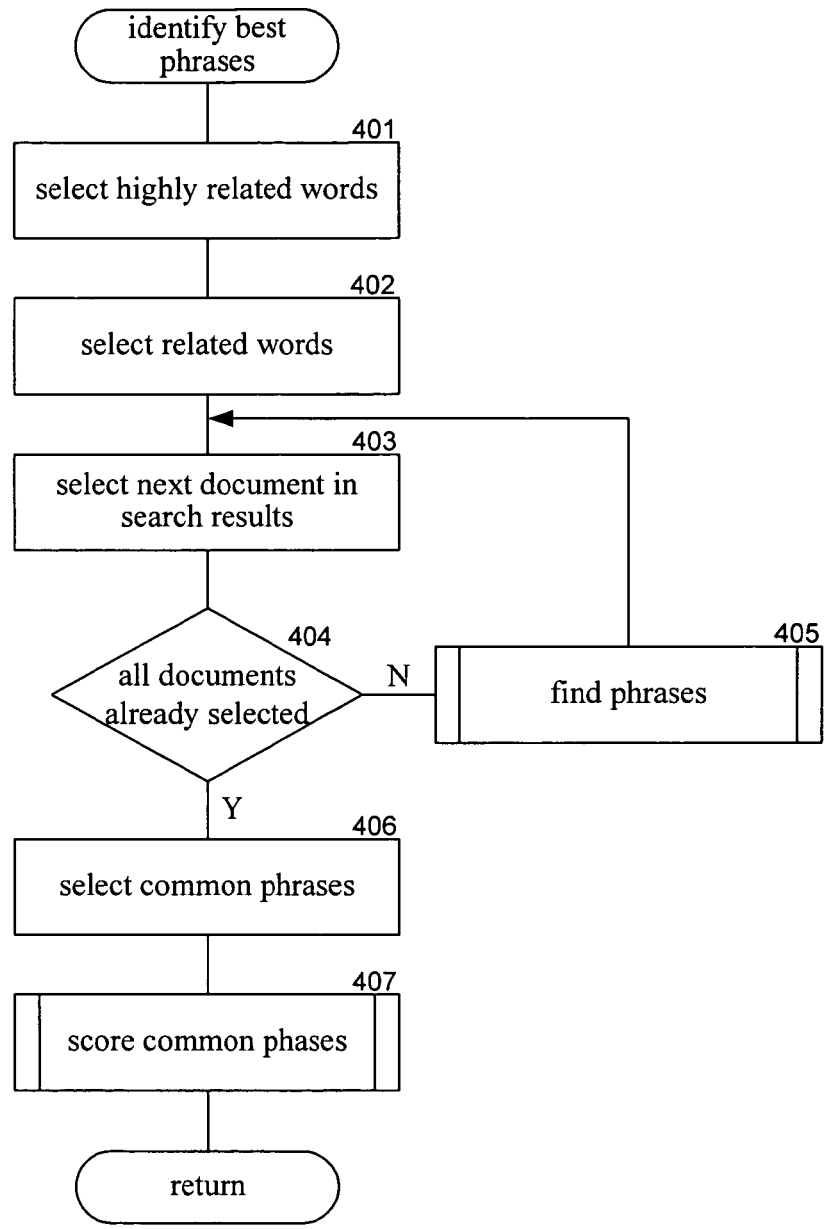
FIG. 4 is a flow diagram that illustrates the processing of the identify best phrases component in one embodiment.

FIG. 4 is a flow diagram that illustrates the processing of the identify best phrases component in one embodiment. In block 401, the component selects the highly related words of the search results. The highly related words may be those words whose score is in the top 15%. The highly related words are used as the anchor words for the phrases. In block 402, the component selects the related words of the search results. The related words may be those words whose score is in the top 40%. The related words include the highly related words. The phrase may be extended to include related words that are near the anchor word. One skilled in the art will appreciate that various criteria can be used to select the highly related words and the related words. For example, the highly related words might be the 10 words with the top scores, and the related words might be the 50 words with the top scores. In addition, the highly related words and the related words could be the same set of words (e.g., the 20 words with the top scores). In blocks 403-405, the component loops selecting documents in the search results and finding phrases within those documents. In block 403, the component selects the next document in the search results. In decision block 404, if all the documents in the search results have already been selected, then the component continues at block 406, else the component continues at block 405. In block 405, the component invokes the find phrases component to find the phrases within the selected document. The component then loops to block 403 to select the next document. In block 406, after the phrases have been found in all the documents, the component selects common phrases, that is, phrases that occur frequently within the documents. For example, a common phrase may be one that occurs more than five times within the documents or that occurs in a certain percentage of the documents. In block 407, the component invokes the score common phrases component to generate a phrase score for each common phrase. The component then returns. The advertisement system derives the search terms from the common phrases.

Figure 5:
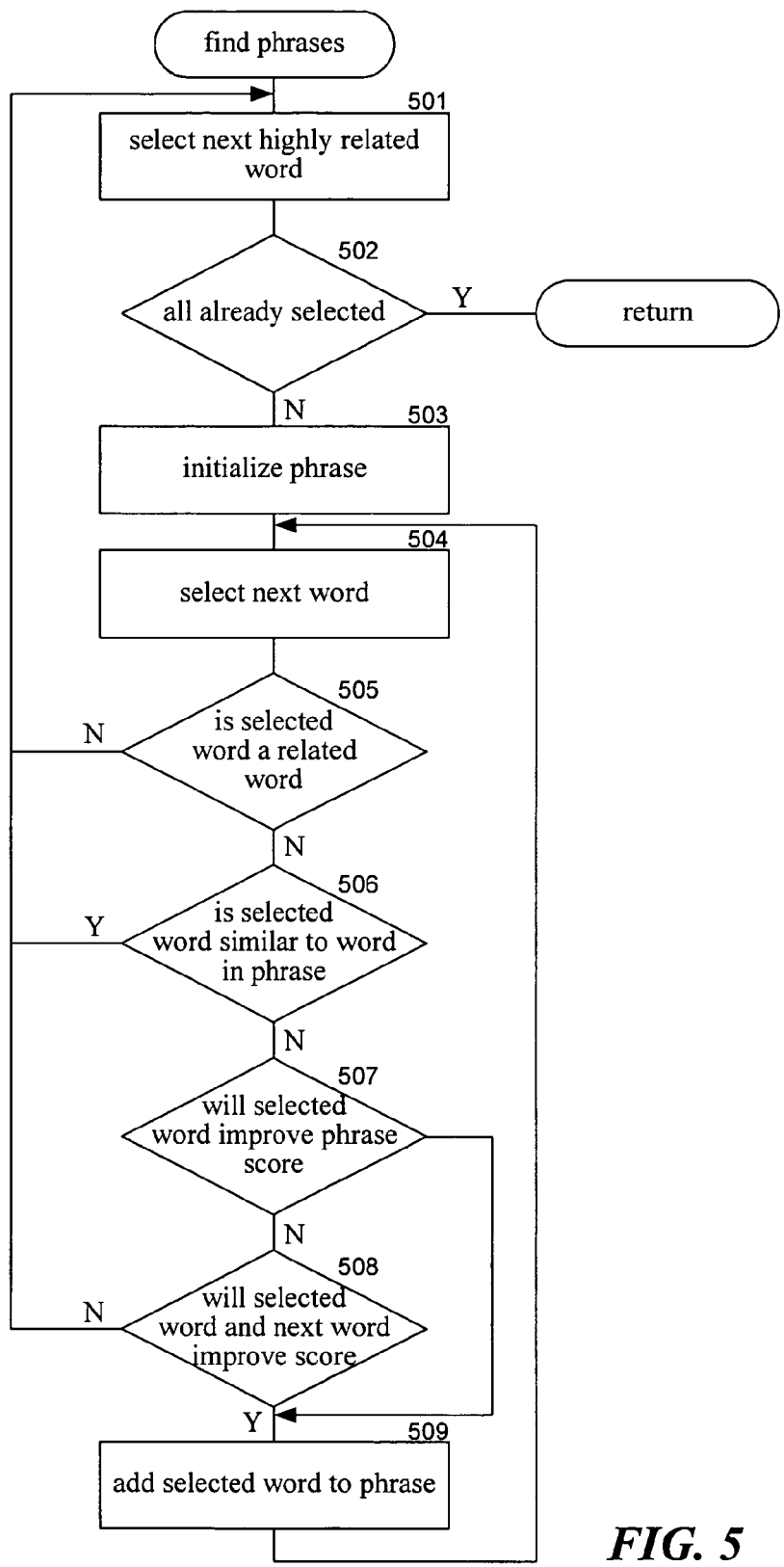
FIG. 5 is a flow diagram that illustrates the processing of the find phrases component in one embodiment.

FIG. 5 is a flow diagram that illustrates the processing of the find phrases component in one embodiment. This component is passed a document and identifies the phrases within the document. In blocks 501-509, the component loops identifying phrases within the documents that have highly related words as anchor words. In block 501, the component selects the next highly related word within the document. In decision block 502, if all the highly related words of the document have already been selected, then the component completes, else the component continues at block 503. In block 503, the component initializes the phrase with the selected highly related word as the anchor word. In blocks 504-509, the component loops extending the phrase to include related words that are nearby. In block 504, the component selects the next word within the document. In decision block 505, if the selected word is a related word, then the component continues at block 506, else the component terminates the extending of the phrase and loops to block 501 to identify the next phrase within the document. In decision block 506, if the selected word is similar to a word already in the phrase, then the component terminates the extending of the phrase and loops to block 501 to identify the next phrase, else the component continues at block 507. In decision block 507, if the selected word will improve the phrase score, then the component continues at block 509, else the component continues at block 508. In decision block 508, if the selected word and the next word after the selected word would improve the phrase score, then the component continues at block 509, else the component terminates the extending of the phrase and loops to block 501 to identify the next phrase. In block 509, the component adds the selected word to the phrase and loops to block 504 to select the next word for extending the phrase.

Figure 6:
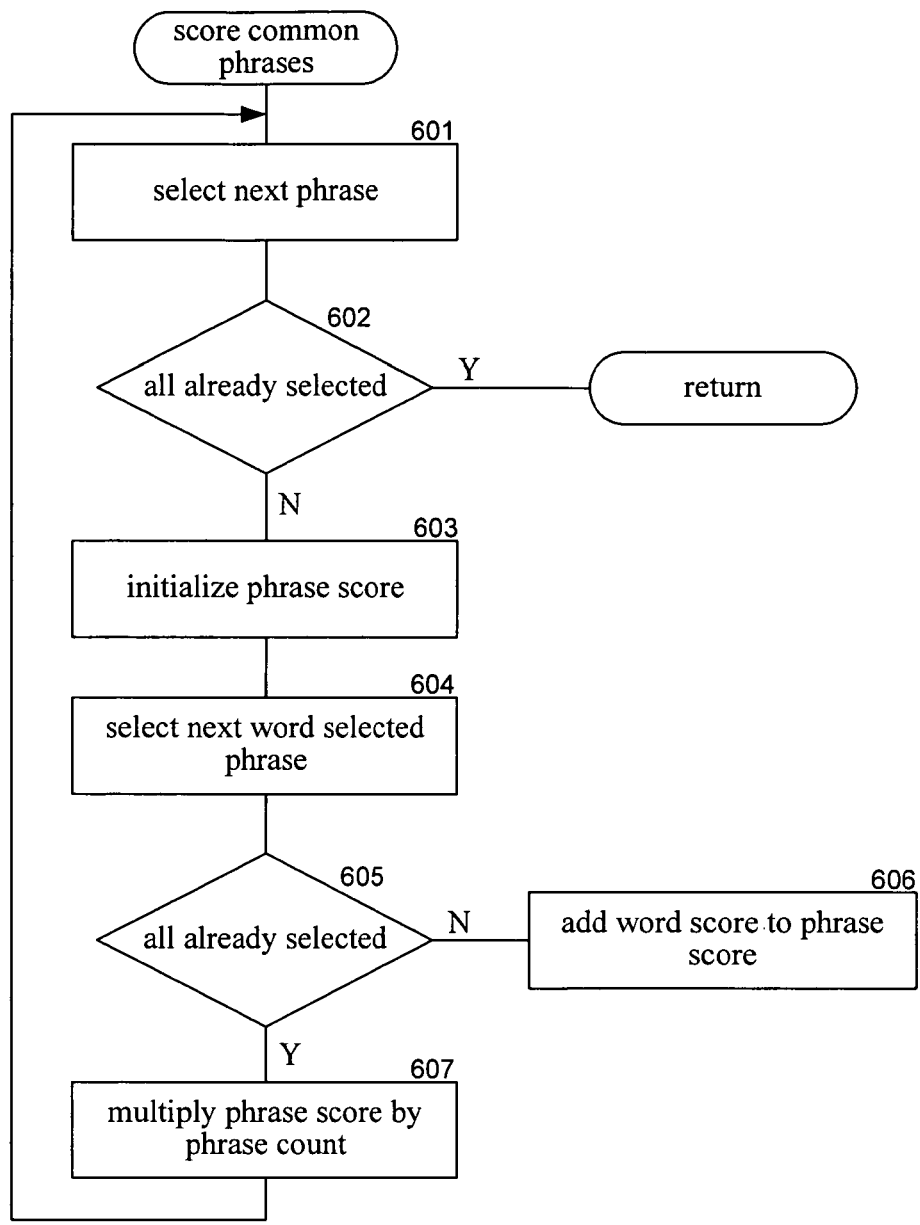
FIG. 6 is a flow diagram that illustrates the processing of the score common phrases component in one embodiment.

FIG. 6 is a flow diagram that illustrates the processing of the score common phrases component in one embodiment. The component calculates a phrase score for the common phrases. Alternatively, the phrase scores may be calculated as each common phrase is identified. In block 601, the component selects the next common phrase. In decision block 602, if all the common phrases have already been selected, then the component returns, else the component continues at block 603. In block 603, the component initializes the phrase score for the selected common phrase. In blocks 604-607, the component loops factoring in the word scores of the words of the common phrase into the phrase score. In block 604, the component selects the next word of the selected common phrase. In decision block 605, if all the words of the selected common phrase have already been selected, then the component continues at block 607, else the component continues at block 606. In block 606, the component adds the word score of the selected word to the phrase score and then loops to block 604 to select the next word of the selected common phrase. One skilled in the art will appreciate that many different techniques may be used for calculating a phrase score. For example, double the word score of highly related words may be added to the phrase score to emphasis the importance of highly related words, a nonlinear combination of word scores may be used, and so on. In block 607, the component multiplies the phrase score by the number of occurrences of the selected common phrase within the search results and the component then loops to block 601 to select the next common phrase.

One skilled in the art will appreciate that although specific embodiments of the advertisement system have been described herein for purposes of illustration, various modifications may be made without deviating from the spirit and scope of the invention. The term "item" includes any product, service, or concept that can be advertised. For example, a political party can place advertisements relating to a particular candidate or cause. In addition, an advertisement set may not have a link associated with it. An advertiser may want to simply display the information of an advertisement to users who submit requests using a certain search term. For example, a candidate may want an advertisement displayed when a user submits a search request with the name of their opponent as a search term. One skilled in the art will appreciate that various equations and techniques for calculating scores can be used. Also, if the search results contain documents that are duplicates (or very similar), the advertising system may disregard the duplicate documents. The advertisement system may maintain a list of words that should not be added to phrases, such as a word that is very common on all web pages (e.g., "next page" or "privacy policy"). Accordingly, the invention is not limited except by the appended claims.

What is claimed is:

1. A computer-implemented method in a computer system for identifying phrases related to an item from a set of one or more documents, the method comprising:
   under control of one or more computer systems configured with executable instructions,
   receiving a description of the item;
   performing a search across a corpus of documents to retrieve a search result set of a plurality of documents, wherein each document in the plurality of documents in the search result set is related to the item based on the description, and wherein each document in the plurality of documents in the search result set comprises a respective plurality of words;
   determining a first frequency of each word in the plurality of documents of the search result set, wherein the first frequency corresponds to an average number of times each word appears in each document of the search result set;
   determining a second frequency of each word in the plurality of documents of the search result set, wherein the second frequency corresponds to an average number of times each word appears in each document of the corpus of documents;
   for each word of the plurality of words, determining a frequency score that is based on a difference between the corresponding first frequency and the corresponding second frequency, wherein the frequency score indicates a level of relevance of the word to the item;
   identifying a set of highly related words to the item based on a threshold number of the plurality of words with the highest frequency scores;
   selecting at least one anchor word from the set of highly related words; and
   identifying at least one phrase including the at least one anchor word by searching each of the plurality of documents in the search result set for the at least one anchor word and identifying at least one word proximal to the at least one anchor word within the plurality of documents.

2. The computer-implemented method of claim 1, wherein identifying the at least one phrase comprises:
   identifying a first phrase that contains two or more words;
   extending the first phrase by one or more words proximal to the first phrase to yield an extended first phrase;
   determining that the extended first phrase has a higher relevant score with respect to the item than the first phrase; and
   identifying the extended first phrase as the at least one phrase.

3. The computer-implemented method of claim 2, further comprising:

identifying, based at least in part on relevant scores for the one or more words proximal to the first phrase, the one or more words proximal to the first phrase.

4. The computer-implemented method of claim 1, further comprising:
excluding one or more words from the at least one phrase that have a frequency in the corpus of documents exceeding a frequency threshold.

5. The computer-implemented method of claim 1, further comprising:
excluding duplicate documents from the search result set.

6. The computer-implemented method of claim 1, wherein the set of highly related words is a first set of highly related words to the item and is based on a first threshold number of the plurality of words with the highest frequency scores, wherein the method further comprises:
identifying a second subset of related words to the item based on a second threshold number of words with the highest frequency scores, wherein the second threshold number of words is larger than the first threshold number of words, and
wherein identifying at least one phrase including the at least one anchor word further comprises:
searching each of the plurality of documents in the search result set for the at least one anchor word; and
identifying at least one word from the second subset of related words that is proximal to the at least one anchor word within the plurality of documents.

7. The computer-implemented method of claim 1, wherein the threshold number of the plurality of words with the highest frequency scores includes a predetermined percentage of the plurality of words.

8. A non-transitory computer-readable storage medium having stored thereon instructions identifying phrases related to an item from a set of one or more information sources, the instructions upon being executed by one or more processors causing one or more computer systems to:
receive a description of the item;
perform a search across a corpus of documents to retrieve a search result set of a plurality of documents, wherein each document in the plurality of documents is related to the item based on the description, and wherein each document in the plurality of documents in the search result set comprises a respective plurality of words;
determine a first frequency of each word in the plurality of documents of the search result set, wherein the first frequency corresponds to an average number of times the word appears in each document of the search result set;
determine a second frequency of each word in the plurality of documents in the search result set, wherein the second frequency corresponds to an average number of times the word appears in each document of the corpus of documents;
for each word of the plurality of words, determine a frequency score that is based on a difference between the corresponding first frequency and the corresponding second frequency, wherein the frequency score indicates a level of relevance of the word to the item;
identify a predetermined number of highly related words to the item based on the predetermined number of words with the highest frequency scores;
select at least one anchor word from the predetermined number of highly related words; and
identify at least one phrase including the at least one anchor word by searching each of the plurality of documents in the search result set for the at least one anchor word and identifying at least one word proximal to the at least one anchor word within the plurality of documents.

9. The non-transitory computer-readable storage medium of claim 8, wherein the instructions that, upon being executed, cause the one or more computer systems to identify the at least one phrase comprises causing the one or more computer systems to:
identify a first phrase that contains two or more words;
identify, based at least in part on relevant scores for one or more words proximal to the first phrase, the one or more words proximal to the first phrase;
extend the first phrase by the one or more words proximal to the first phrase to yield an extended first phrase;
determine that the extended first phrase has a higher relevant score with respect to the item than the first phrase; and
identify the extended first phrase as the at least one phrase.

10. The computer-readable storage medium of claim 9, wherein the instructions upon being executed further cause the one or more computer systems to:
exclude one or more words synonymous to the at least one word in the first phrase.

11. The computer-readable storage medium of claim 8, wherein the instructions upon being executed further cause the one or more computer systems to:
exclude noise words from the at least one phrase.

12. The computer-readable storage medium of claim 8, wherein the instructions upon being executed further cause the one or more computer systems to:
exclude duplicate documents from the search result set.

13. A computer system for identifying phrases related to an item from a set of one or more documents, comprising:
at least one processor;
memory including instructions that, upon being executed by the at least one processor, cause the computer system to:
receive a description of the item;
perform a search across a corpus of documents and retrieve a search result set of a plurality of documents, wherein each document in the plurality of documents is related to the item based on the description, and wherein each document in the plurality of documents in the search result set comprises a respective plurality of words;
determine a first frequency of each word in the plurality of documents in the search result set, wherein the first frequency corresponds to an average number of times the word appears in each document of the search result set;
determine a second frequency of each word in the plurality of documents in the search result set, wherein the second frequency corresponds to an average number of times the word appears in each document of the corpus of documents;
determine a frequency score that is based on a difference between the corresponding first frequency and the corresponding second frequency of each word, wherein the frequency score indicates a level of relevance of the word to the item;
identify a predetermined number of highly related words to the item based on the predetermined number of words with the highest frequency scores;
select at least one anchor word from the predetermined number of highly related words; and identify at least one phrase including the at least one anchor word by searching each of the plurality of documents in the search result set for the at least one anchor word and identifying at least one word proximal to the at least one anchor word within the plurality of documents.

14. The computer system of claim 13, wherein the instructions that, upon being executed, cause the computer system to identify the phrase includes causing the computer system to:

identify a first phrase that contains two or more words;

extend the first phrase by one or more words proximal to the first phrase to yield an extended first phrase;

determine that the extended first phrase has a higher relevant score with respect to the item than the first phrase; and identify the extended first phrase as the at least one phrase.

15. The computer system of claim 14, wherein the instructions upon being executed further cause the computer system to:

identify, based at least in part on relevant scores for the one or more words proximal to the first phrase, the one or more words proximal to the first phrase.

16. The computer system of claim 13, wherein the instructions upon being executed further cause the computer system to:

exclude noise words from the at least one phrase.

17. The computer system of claim 13, wherein the instructions upon being executed further cause the computer system to:

exclude duplicate documents from the search result set.

18. The computer-implemented method of claim 1, further comprising:

submitting information about the item to a search engine; and receiving the search result set from the search engine.

19. The computer-implemented method of claim 1, further comprising:

generating one or more search terms for the item based on the at least one phrase; and submitting a request to place an advertisement for the item to a search engine service, the request including the one or more search terms.

20. The non-transitory computer-readable storage medium of claim 8, wherein the instructions upon being executed further cause the one or more computer systems to:

generate one or more search terms for the item based on the at least one phrase; and submit a request to place an advertisement for the item to a search engine service, the request including the one or more search terms.

21. The computer system of claim 13, wherein the instructions upon being executed further cause the computer system to:

generate one or more search terms for the item based on the at least one phrase; and submit a request to place an advertisement for the item to a search engine service, the request including the one or more search terms.

* * * * *